Figure 1:
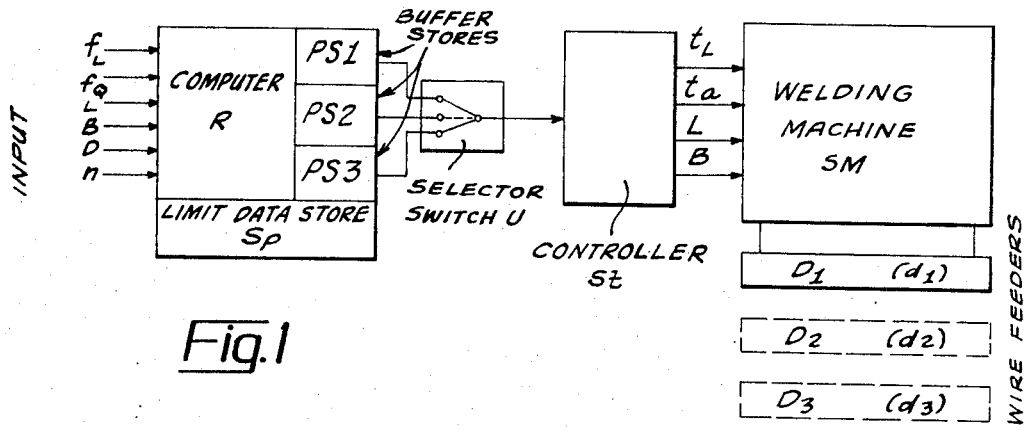

United States Patent [19]
Ritter et al.

[11] 3,727,038
[45] Apr. 10, 1973

[54] APPARATUS FOR MANUFACTURING WELDED WIRE MESH MATS FOR REINFORCING CONCRETE

[75] Inventors: Josef Ritter, Wilhelm Boyer, Gerhard Ritter, Klaus Ritter, all of Graz, Styria, Austria

[73] Assignee: EVG Entwecklungs-und Verwertungsgesellschaft, Graz, Austria

[22] Filed: Oct. 21, 1971

[21] Appl. No.: 191,360

Related U.S. Application Data

[63] Continuation of Ser. No. 838,901, July 3, 1969 abandoned.

[52] U.S. Cl. ..................235/151.1, 219/55, 444/1
[51] Int. Cl. ..................G06f 15/46, B23k 29/00
[58] Field of Search ..................219/58; 235/151.1; 444/1

[56] References Cited

UNITED STATES PATENTS 3,497,659 2/1970 Ritter et al..................219/58 X
3,539,752 11/1970 Ernst..................219/58 X
3,619,541 11/1971 Webers..................219/58 X

*Primary Examiner*—Malcolm A. Morrison
*Assistant Examiner*—R. Stephen Dildine, Jr.
*Attorney*—Ernest F. Marmorek

[57] ABSTRACT

A computer controlled apparatus for manufacturing welded wire mesh mats for reinforcing concrete is described. The welding machine has means for adjusting the longitudinal wire spacing, the transverse wire spacing, the mat length and the mat width. The adjustment device is controlled by automatic controllers which receive orders from the computer. The computer contains a limit data store in which can be stored standard limiting values for the wire mat such as limits derived from official building regulations, and the computer, on the basis of input data relating to the desired longitudinal and transverse strengths of the mat, taken in combination with the standard limiting values, determines the economically best combination of values for the mats and transmits corresponding orders to the controllers of the welding machine.

10 Claims, 2 Drawing Figures

PATENTED APR 10 1973    3,727,038

INVENTORS:
Josef Ritter, Wilhelm Boyer,
Gerhard Ritter and Klaus Ritter,

BY  *[signature]*

THEIR ATTORNEY

APPARATUS FOR MANUFACTURING WELDED WIRE MESH MATS FOR REINFORCING CONCRETE

This is a continuation of application Ser. No. 838,901 filed July 3, 1969.

Welded wire mesh for reinforcing concrete can be supplied to the customer in the form of cut-off lengths called "mats." Mats of the kind have hitherto been manufactured by operating wire mesh welding machines which function essentially continuously, the mesh being cut off into lengths on the basis of a pre-set program. The machine produces a large variety of standard mats of different sizes and types. However although the length varies, the width is usually the same. The wire diameter varies and so does the wire spacing. Owing to the large number of variations, storage is a considerable problem. Each customer is supplied with mats agreeing approximately with his requirements as to size of mat, wire diameter and wire spacing, this being done by cutting the standard mats to suit the customer's particular requirements.

This method involves a good deal of wastage of material, because the cut-off parts of the mats have to be scrapped. Furthermore the mats which have been tailored in this way from standard mats seldom agree precisely with the customer's requirements. The method has hitherto been used because of the high cost, in time and in labor, of re-setting the welding machine for each batch of mats, so as to produce each time exactly the kind of mat desired by the customer. The cost of this kind of individualized production greatly outweighs the losses due to wastage of material in tailoring standard mats down to the customer's requirements.

In accordance with the present invention, apparatus for manufacturing welded wire mesh for reinforcing concrete comprises at least one mesh welding machine equipped with devices for adjusting the longitudinal wire spacing, the transverse wire spacing, the wire mesh mat length and the wire mesh mat width, the adjustment devices being controllable by an automatic controller which receives instructions from a computer containing a limit data store in which there are stored standard limiting values for the wire mats, the computer being arranged in such a way that on the basis of input data relating to the desired longitudinal and transverse strengths of the mats, taken in combination with the limiting values mentioned above, the computer determines the economically best combination of values for the mats and transmits corresponding orders to the controller of the welding machine.

With this arrangement the disadvantages mentioned above are avoided. The apparatus can produce batches of mat exactly according to the customer's requirements, as to length of mat, width of mat and mechanical strength. The change over from one type of mat to another can be made so easy and so rapid that the machine can operate almost continuously, or as nearly continuously as a machine which is producing standard mats as described above. When a customer requires a programme of mats of particular types and sizes for a construction project, these mats can be produced by the machine, one after the other, in sizes and types precisely as required, taking into account the required longitudinal and transverse mechanical strenths, and taking into account the officially specified limits laid down in the official standard specifications. Finally, the storage problems involved in keeping a stock of a large number of different standard sized mats are eliminated, with corresponding economy in space and operating capital.

The official standards do not in practice allow mats of all the required types to be manufactured using wire of only one diameter, although this would be desirable for economic reasons. In practice, it is necessary to use wire of several different diameters (several different cross sections). In Austria for example, the official standards make it necessary to use three or four different wire thicknesses. When it comes to deciding which wire thickness to use for a particular type of mat, this depends in Austria for example, on the officialy specified ratio between the thickness of the concrete slab in which the mat is embedded and the wire spacing. In the apparatus according to the invention there are therefore fed to the computer not only the longitudinal and transverse strength requirements for the particular batch of mat, but also data on the limits specified in the official standards together with, in Austria, the thickness of the concrete slab which is going to receive the wire mat as reinforcement.

When a mat is to be manufactured to specified longitudinal and transverse strengths, the official standards usually allow the mat to be manufactured using either of two different wire diameters. The computer must therefore determine which of the two wire diameters will give the most economical result. In the apparatus according to the invention the computer determines this and transmits its decision to the controller of the welding machine.

In manufacturing a programme of mats the different types of mat often require different wire diameters. To meet this requirement, a single welding machine can be used, which is switched over from one wire diameter to another as necessary. Alternatively the apparatus may comprise several welding machines, each using only one wire diameter.

If a single welding machine is used having two or more alternative wire feeders for selectively feeding wires of different diameters the computer preferably contains buffer stores for storing those operating instructions for the controller of the welding machine which require wire other than that currently being fed to the welding machine, the welding machine being provided with a device for connecting the buffer stores to the controller as soon as the wire feeder on the welding machine has been changed over to feed wires of appropriate diameters.

If the particular kind of welding machine used has to be stopped for adjusting longitudinal and transverse wire spacing, mat length and mat width, that is to say, if the adjustments can be made only when the machine is not operating, the programming must allow the necessary idle time during the change over from one type of mat to another. On the other hand, if the welding machine is of the type which allows the adjustments to be made without interrupting operation of the machine, the programming need not provide an interval for making the adjustments. Moreover in this case the further possibility arises that the wire spacing can be varied over the surface of each mat, for example the transverse wire spacing can if desired be made closer near the edges of the mat, or any other desired variation of spacing can be produced. As a further possibility the longitudinal and transverse wire spacing at particular locations on the mat can be standardized, for example, by manual adjustment of the machine, the computer determining the wire spacing over the remaining areas of the mat.

When mat is being manufactured in this way, that is to say produced in a succession of batches to suit the customer's programme, it is advisable to attach an identifying label to each batch, to prevent confusion. The computer is preferably equipped with a printing device which prints information, on a card for example, for each batch of mat, indicating the characteristics of the batch. The card can be attached to the mat in the form of a label. A copy of the card can serve for invoicing purposes.

Figure 2:
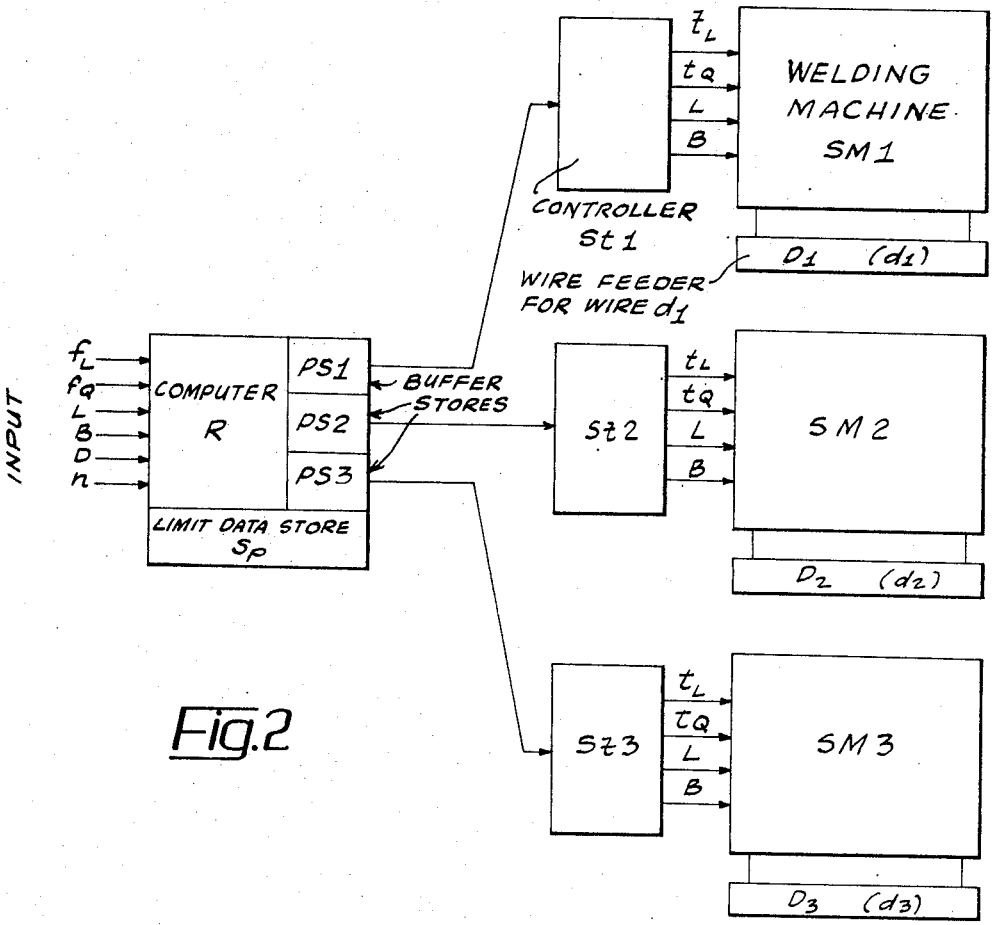

Two examples of apparatus constructed in accordance with the invention are illustrated diagrammatically in the accompanying drawings in which:

FIG. 1 represents an apparatus which has one welding machine, which is fed selectively with wire of any one of three different diameters; and FIG. 2 represents apparatus which has three welding machines, each using wire of only one diameter.

FIG. 1 shows a wire mesh welding machine SM diagrammatically, in the form of a block. Under this block the Figure shows elongated blocks D1, D2, D3, for feeding selectively wires of three diameters $d1$, $d2$, $d3$. The wire feeder D1 is shown in full lines to indicate that this size of wire is being fed to the machine. Similarly, the machine has three transverse wire feeders (not shown) for feeding selectively transverse wires of three different diameters. The welding machine is controlled by a controller $St$ which is connected by a selector switch U selectively to any one of three buffer stores PS1, PS2, PS3, of a computer R. The computer also contains a limit data store $Sp$ which stores information relating to the officially specified limits governing the manufacture of wire mesh mats. In Austria the longitudinal and transverse wire spacings have upper and lower limits which depend on the thickness of the concrete slab which is to be reinforced.

The computer R also contains a large number of registers which contain the data to be used in the manufacture of the different types of mat. Groups of data are transferred one after the other to the computer.

The computer has the following input terminals:
Input $f_L$, longitudinal wire cross section data,
Input $f_Q$, transverse wire cross section data,
Input L, length of mat,
Input B, width of mat,
Input D, thickness of concrete slab,
Input n, number of mats to make up the batch.

The group of data for a particular batch of mats is processed by the computer as follows. On the basis of the input data $f_L$, $f_Q$, and D, in conjunction with the information stored in the limit data store $Sp$, the computer determines which of the three wire diameters $d1$, $d2$, or $d3$, must be used in manufacturing the particular batch of mats so as to obtain the most economical result. The computer determines the corresponding longitudinal wire spacing $t_L$ and transverse spacing $t_Q$, and transmits this information to the corresponding buffer store PS1, PS2 or PS3, together with the input information, L, B and n. The computer processes all the groups of data for the entire production programme in this way, so that finally the three buffer stores PS1, PS2 and PS3 contain between them the operating data for manufacturing the programme of batches, using the wire thicknesses $d1$, $d2$, $d3$.

The quantity $t_L$ is used to control the transverse spacing of the electrodes on the welding machine and consequently the longitudinal wire spacing, and the diameter of the longitudinal wires.

The quantity $t_Q$ is used to control the length of stroke of the intermittent advance mechanism of the welding machine in such a way that after a transverse wire has been welded to the longitudinal wires, the intermittent advance mechanism advances the longitudinal wires by an amount corresponding to the desired transverse wire spacing.

The quantity L is used to control either a cut-off shear, which cuts off the completed wire mesh into mats of the correct length or a shear located between the longitudinal wire feeders D1, D2 or D3 and the welding machine SM, so that the longitudinal wires are fed to the machine already cut to length.

The quantity B is used to control a shear which cooperates with the transverse wire feeders so as to cut off the transverse wires to the correct length.

As soon as all the mats containing wires of diameter $d1$ have been made the welding machine SM is changed over to take wires of diameter $d2$, whereupon the selector switch U is switched over to make connection with the buffer store PS2, the machine now proceeding to manufacture all the mats containing wire of diameter $d2$. Finally, the machine is changed over again, this time to take wire of diameter $d3$, and the selector switch is switched over to the buffer store PS3, whereupon the machine makes all the mats containing wires of diameter $d3$.

The apparatus shown in FIG. 2 contains three welding machines SM1, SM2 and SM3, taking wires of diameters respectively $d1$, $d2$, and $d3$, that is to say each machine takes only the one kind of wire. In this machine the computer R has the same input terminals as in FIG. 1, and has buffer stores PS1, PS2, PS3, and a limit data store $Sp$, as already described above. In this case however each buffer store PS1, PS2, PS3 is connected exclusively to a controller $St1$, $St2$, $St3$, each controller controlling its own welding machine SM1, SM2, SM3.

In both these examples each input register is capable of storing a large number of data, groups of data being processed by the computer, one after the other, and then transferred to the buffer stores, where they are stored. The machine shown in FIG. 1 achieves the best possible utilization of a single welding machine during the periods when the machine remains adjusted to take a particular size of wire. The machine shown in FIG. 2, on the other hand, provides optimal utilization of all three welding machines, the three machines manufacturing wire mats simultaneously.

In regard to the officially specified limits stored in the limit data store $Sp$ the quantities vary from country to country. Although in this example only the single limiting quantity D, the thickness of the concrete slab, has been mentioned, there can of course be stored in $Sp$ any other quantity, or several quantities, which may need to be taken into account in satisfying regulations prevailing in any particular country.

In regard to the readjustment of the machine before starting to make another batch of mats, this can in principle be done in either of two different ways. By the first method all the adjustment devices are first of all returned to zero positions, after which the computer gives the orders for a complete re-setting of the machine. By the second method, as soon as a batch of mats has been completed, the existing positions of the adjustment devices are signalled back to the computer, whereupon the computer gives the necessary orders for re-setting each adjustment device to the value desired for the next batch of mats. By this method the computer merely determines, for each adjustment device, the difference between the old setting and the new setting, signalling the difference to the adjustment device on the machine.

The actual computation of spacings for various diameter wires and of a selection of the most economical possibility will be more readily apparent from the following numerical examples:

WIRES AVAILABLE:

| Wire diameter cm | area of cross section cm² | price per m of length (units) |
|---|---|---|
| $d_1$ | $f_{e1}$ | $p_1$ |
| $d_2$ | $f_{e2}$ | $p_2$ |
| $d_3$ | $f_{e3}$ | $p_3$ |

Imposed limitations:
Line Wire Spacing:
    Maximum $D + 8$ cm but not more than 20 cm
    Minimum $2d_i$ but not less than 2 cm
Cross Wire Spacing:
    Maximum 33 cm
    Minimum $2d_i$ but not less than 2 cm
    Values resulting from statical computation:
$f_L$ (cm²/m) required steel area per m of width of mat
$f_Q$ (cm²/m) required steel area per m of length of mat
L (m) length of individual mat in m
B (m) width of individual mat in m
D (cm) depth of slab
n required number of mats of a given batch
Line Wires:
Required number of line wires $m_{Lo}$:

$$m_{Lo} = (f_L/f_e)B$$

approximate by the next integral number bigger than $m_{Lo} \ldots m_L$
Steel area actually on hand in direction of line wires:

$$F_L = (m_L \cdot f_e)/(B) \ldots (\text{cm}^2/\text{m})$$

Required spacing of line wires:

$$e_L = (B \cdot 100)/(m_L - 1) \ldots (\text{cm})$$

Introduction of limiting conditions:
Calculate $(D+8) - 20 = k \quad 2d_i - 2 = r$
If $k \geq 0 ; r \geq 0 \quad 20 \geq e_L \geq 2d_i$
    If this condition is not met with wire on hand the particular type of wire is not suited for production of mats.
If $k \geq 0 ; r < 0 \quad 20 \geq e_L \geq 2$
    If this condition is not met with wire on hand that particular type of wire is not suited for production of mats.
If $k < 0 ; r \geq 0 \quad (D+8) \geq e_L \geq 2d_i$ If this condition is not met with wire on hand that particular type of wire is not suited for production of mats.
If $k < 0 ; r < 0 \quad (D+8) \geq e_L \geq 2$
    If this condition is not met with wire on hand that particular type of wire is not suited for production of mats.
Price of line- wire - material required for the production of the whole batch:

$$P_L = n \cdot m_L \cdot L \cdot p$$

Cross Wires

Required number of cross wires $m_{Qo}$:

$$m_{Qo} = (f_Q/f_j) \cdot L$$

approximate by next integral number bigger than $m_{Qo} \ldots m_Q$
Steel area actually on hand in direction of cross wires:

$$F_Q = (m_Q \cdot f_e)/(L) \ldots (\text{cm}^2)$$

Cross wire spacing:

$$e_Q = (L \cdot 100)/(m_Q - 1)$$

Calculate: $2d_i - 2 = r$
If $r \geq 0 \quad 33 \geq e_Q \geq 2d_i$
    If this condition is not met that particular type of wire is unsuited for the production of the mats.
If $r < 0 \quad 33 \geq e_Q \geq 2$
    If this condition is not met with wire on hand that particular type of wire is unsuited for production of mats.
Price of cross- wire- material required for the production of the whole batch :

$$P_Q = n \cdot m_Q \cdot B \cdot p$$

If $n$ different types of wire are on hand compute all values $P_{Li}$ for $i = 1,2,3 \ldots n$ and $P_{Qi}$ for $i = 1,2,3 \ldots n$ and add $P_{L1} + P_{Q1} = P_{11}$
$P_{L1} + P_{Q2} = P_{12}$
  .
  .
  .
$P_{L1} + P_{Qn} = P_{1n}$
$P_{L2} + P_{Q1} = P_{21}$
  .
  .
$P_{L2} + P_{Qn} = P_{2n}$
  .
  .
$P_{Ln} + P_{Qn} = P_{nn}$ The least value $P_{ik}$ indicates the economic optimum!

EXAMPLE 1

WIRES AVAILABLE

| $d_i$ cm | $f_{ei}$ sqcm | $p_i$ units |
|---|---|---|
| 0,3 | 0,07 | 0,30 |
| 0,6 | 0,28 | 1,10 |
| 0,9 | 0,64 | 2,40 |

Imposed limitations as in previous paragraph.
Values resulting from statical computation:
$f_L$      4.2 sqcm per m $f_Q$    1.4 sqcm per m
$L$    5.0 m
$B$    1.7 m
$D$    16 cm
$n$    25

A.
$d_1 = 0.3$ cm    (Line wire)
$m_{Lo} = (4.2/0.07) \cdot 1.70 = 102 \ldots m_L = 102$
$F_L = (102 \cdot 0.07)/1.70 = 4.2$ sqcm per m
$e_L = 170/101 = 1.68$ cm
$k = (16+8) - 20 = 4 > 0$    $r = 0.6 - 2 = -1.4 < 0$
Therefore $20 > 1.68 < 2$
Condition not met, wire unsuited!

B.
$d_2 = 0.6$ cm    (Line wire)
$m_{Lo} = (4.2/0.28) \cdot 1.70 = 25.5 \ldots m_L = 26$
$F_L = (26 \cdot 0.28)/1.70 = 4.28$ sqcm per m
$e_L = 170/25 = 6.8$ cm
$k = (16+8) - 20 = 4 > 0$ $r = 1.2 - 2 = -0.8 < 0$
Therefore: $20 > 6.8 > 2$
Condition satisfied, wire may be used!
$P_{L2} = 25 \cdot 26 \cdot 5.0 \cdot 1.10 = 3,575$ C.
$d_3 = 0.9$ cm    (Line wire)
$m_{Lo} = (4.2/0.64) \cdot 1.70 = 11.2 \ldots m_L = 12$
$F_L = (12 \cdot 0.64)/1.70 = 4.52$ sqcm per m
$e_L = 170/11 = 15.4$ cm
$k = (16+8) - 20 = 4 > 0$ $r = 1.8 - 2 = -0.2 < 0$
Therefore: $20 > 15.4 > 2$
Condition satisfied, wire may be used!
$P_{L3} = 25 \cdot 12 \cdot 5.0 \cdot 2.40 = 3,600$ D.
$d_1 = 0.3$ cm    (Cross wire)
$m_{Qo} = (1.4/0.07) \cdot 5.0 = 100 \ldots m_Q = 100$
$F_Q = (100 \cdot 0.07)/5.0 = 1.4$ sqcm per m
$e_Q = 500/99 = 5.05$ cm
$r = 0.6 - 2 = -1.2 < 0$
Therefore: $33 > 5.05 > 2$
Condition satisfied, wire may be used.
$P_{Q1} = 25 \cdot 100 \cdot 1.70 \cdot 0.3 = 1,275$ E.
$d_2 = 0.6$ cm    (Cross wire)
$m_{Qo} = (1.4/0.28) \cdot 5.0 = 25 \ldots m_Q = 25$
$F_Q = (25 \cdot 0.28)/5.0 = 1.40$ sqcm per m
$e_Q = 500/24 = 20.8$ cm
$r = 1.2 - 2 = -0.8 < 0$
Therefore: $33 > 20.8 > 2$
Condition satisfied, wire may be used.
$P_{Q2} = 25 \cdot 25 \cdot 1.70 \cdot 1.10 = 1,168.75$ F.
$d_3 = 0.9$ cm    (Cross wire)
$m_{Qo} = (1.40/0.64) \cdot 5.0 = 10.9 \ldots m_Q = 11$
$F_Q = (11 \cdot 0.64)/5.0 = 1.41$ sqcm per m
$e_Q = 500/10 = 50$
$r = 1.8 - 2 = -0.2 < 0$
Therefore: $33 < 50 > 2$
Condition not satisfied, wire must not be used!

The economic optimum:
$P_{L2} + P_{Q1} = P_{21} = 3,575 + 1,275 = 4,850$
$P_{L2} + P_{Q2} = P_{22} = 3,575 + 1,168.75 = 4,743.75$
$P_{L3} + P_{Q1} = P_{31} = 3,600 + 1,275 = 4,875$
$P_{L3} + P_{Q2} = P_{32} = 3,600 + 1,168.75 = 4,768.75$ $P_{22}$ is the economic optimum!
The mats to be produced have the specifications:
Line wires
$d = 0.6$ cm
$e_L = 6.8$ cm
26 line wires
$F_L = 4.28$ sqcm per m
Cross wires
$d = 0.6$ cm
$e_Q = 20.8$ cm
25 cross wires
$F_Q = 1.4$ sqcm per m

EXAMPLE 2

Wires available:
The same as in Example 1.
Imposed limitations:
The same as in Example 1
Values resulting from statical computation:
$f_L = 7.3$ sq cm per m
$f_Q = 2.0$ sq cm per m
$L = 4.70$ m
$B = 1.40$ m
$D = 18$ cm
$n = 40$ A. $d_1 = 0.3$ cm    (Line wire)
Since $f_L = 7.3$ sq cm per m is bigger than the corresponding value in Example 1, a wire with a diameter of 0.3 cm cannot satisfy the condition $20 > e_L > 2$ B.
$d_2 = 0.6$ cm    (Line wires)
$m_{Lo} = (7.3/0.28) \cdot 1.40 = 36.6 \ldots m_L = 37$
$F_L = (37 \cdot 0.28)/1.40 = 7.4$ sq cm per m
$e_L = 140/36 = 3.9$ cm
$k = 26 - 20 = 6 > 0$    $r = 1.2 - 2 = -0.8 < 0$ $$20 > 3.9 > 2$$

Condition satisfied
$P_{L2} = 40 \cdot 37 \cdot 4.70 \cdot 1.10 = 7,651.60$

C.
$d_3 = 0.9$ cm    (Line wires)
$m_{Lo} = (7.3/0.64) \cdot 1.40 = 16 \ldots m_L = 16$
$F_L = (16 \cdot 0.64)/1.40 = 7.30$ sq cm per m
$e_L = 140/15 = 9.3$ cm
$k = 26 - 20 = 6 > 0$    $r = 1.8 - 2 = -0.2 < 0$ $$20 > 9.3 > 2$$

Condition satisfied
$P_{L3} = 4.0 \cdot 16 \cdot 4.7 \cdot 2.4 = 7,219.20$

D.
$d_1 = 0.3$ cm    (Cross wires)
$m_{Qo} = (2.0/0.07) \cdot 4.70 = 134.2 \ldots m_Q = 135$
$F_Q = (135/4.70) \cdot 0.07 = 2.01$ sq cm per m
$e_Q = 470/134 = 3.5$ cm
$r = 0.6 - 2 = -1.4 < 0$
$33 > 3.5 > 2$    Condition satisfied
$P_{Q1} = 40 \cdot 135 \cdot 1.40 \cdot 0.30 = 2,268.0$ E.
$d_2 = 0.6$ cm    (Cross wires)
$m_{Qo} = (2.00/0.28) \cdot 4.70 = 33.5 \ldots m_Q = 34$
$F_Q = (34 \cdot 0.28)/4.70 = 2.02$ sq cm per m
$e_Q = 470/33 = 14.2$ cm
$r = 1.2 - 2 = -0.8 < 0$
$33 > 14.2 > 2$    Condition satisfied
$P_{Q2} = 40 \cdot 34 \cdot 1.40 \cdot 1.10 = 2,094.4$ F.
$d_3 = 0.9$ cm    (Cross wires)
$m_Q = (2.00/0.64) \cdot 4.70 = 14.7 \ldots m_Q = 15$
$F_Q = (15 \cdot 0.64)/4.70 = 2.05$ sq cm per m
$e_Q = 470/14 = 33.6$ cm
$r = 1.8 - 2 = -0.2 < 0$ 33 < 33.6 > 2   Condition not satisfied, wire must not be used!

The economic optimum:

$P_{L2} + P_{Q1} = P_{21} = 7,651.60 + 2,268.0 = 9,919.60$
$P_{L2} + P_{Q2} = P_{22} = 7,651.60 + 2,094.4 = 9,746.00$
$P_{L3} + P_{Q1} = P_{31} = 7,219.20 + 2,268.0 = 9,487.20$
$P_{L3} + P_{Q2} = P_{32} = 7,219.20 + 2,094.4 = 9,313.60$

The mats to be produced have the specification:

| Line wires | cross wires |
|---|---|
| $d = 0,9$ cm | $d = 0,6$ cm |
| $e_L = 9,3$ cm | $e_Q = 14,2$ cm |
| $F_L = 7,3$ sq cm per m | $F_Q = 2,02$ sq cm per m |
| 16 Line wires | 34 Cross wires. |

We claim:

1. A process for manufacturing welded wire mesh mats for reinforcing concrete with the aid of at least one welding machine having wire feeders, devices for adjusting the longitudinal wire spacings, the transverse wire spacing, the wire mesh mat length and wire mesh mat width, an automatic controller for controlling the operation of said welding machine in response to order signals and a computer for providing and feeding said order signals to said automatic controller, comprising the steps of feeding input data relating to the desired longitudinal and transverse strengths of the wire mesh mats to the computer, combining said input data in the computer with standard limiting values for the wire mesh mats stored in the computer, determining the economically best combination of values for the wire mesh mats by the computer and transmitting the resulting order signals from the computer to the automatic controller.

2. A process according to claim 1 wherein said standard limiting values for the mats are longitudinal wire cross-section data $f_L$, transverse wire cross-section data $f_Q$, thickness of concrete slab D, said input information data are the length L of mat, the width B of the mat, number $n$ of mats to make up a batch, and the resulting parameters of the mats to be manufactured are the longitudinal wire spacing $t_L$ and the transverse wire space $t_Q$.

3. A process according to claim 2, comprising the steps of feeding the input data $f_L, f_Q$ and D to the computer, combining said input data in the computer with information stored in a limiting data store of the computer, determining by the computer the wire diameters $d1, d2, d3$ required in order to obtain the most economical results in manufacturing a particular batch of wire mats, evaluating the corresponding longitudinal wire spacing $t_L$ and transverse wire spacing $t_Q$ and transmitting the corresponding information together with the input information L, B and $n$ to buffer-stores PS 1, PS 2, PS 3, each of said buffer-stores receiving and storing all operating data requisite for manufacturing the program of batches using wires with one of the diameters $d1, d2, d3$ and being selectively connectable to the automatic controller of a wire mesh welding machine equipped with a plurality of wire feeders D 1, D 2, D 3 containing wire of the diameters $d1, d2, d3$ respectively, and connecting the respective buffer-store to the automatic controller of the wire mesh welding machine when the machine is changed to receive wire from another feeder.

4. A process according to claim 2 comprising the steps of feeding the input data $f_L, f_Q$ and D to the computer, combining the input data in the computer with information stored in the limiting data store Sp of the computer, determining by the computer the wire diameters $d1, d2, d3$ required in order to obtain the most economical result in manufacturing a particular batch of wire mesh mats, evaluating the corresponding longitudinal wire spacing $t_L$ and transverse wire spacing $t_Q$ and transmitting the corresponding information together with the input information L, B and n to buffer-stores PS 1, PS 2, PS 3, each of said buffer-stores receiving and storing all operating data requisite for manufacturing the program of batches using wire with one of the diameters $d1, d2, d3$ and being connected to the automatic controller of one of a plurality of wire-mesh welding machines to which wire of the corresponding diameter is fed.

5. A process according to claim 1 comprising the steps of forming a pattern of longitudinal wires in accordance with the computed parameters, feeding consecutively transverse wires across said longitudinal wires, welding consecutively each transverse wire to said longitudinal wires and intermittently advancing said pattern of longitudinal wires in concert with the feed of said transverse wires, all in accordance with the computed data.

6. A process according to claim 1 comprising the additional step of printing the characteristics of each batch of mats on a card by means of a printing device attached to the computer.

7. A process for manufacturing welded wire mesh mats for reinforcing concrete comprising the steps of manually adjusting the wire spacings in certain areas of the mat, feeding input data relating to the desired longitudinal and transverse strengths of the remaining areas of the mat to a computer, combining said input data in the computer with standard limiting values for the wire mesh mats stored in the computer, determining the economically best combination of values for the wire mesh mats by the computer and transmitting corresponding orders from the computer to the automatic controller of at least one wire mesh welding machine which is equipped with devices for adjusting the longitudinal wire spacing, the transverse wire spacing, the wire mesh mat length and the wire mesh mat width, said devices being controllable by said automatic controller.

8. A process for manufacturing welded wire mesh mats for reinforcing concrete comprising the steps of manually feeding information for the adjustment of longitudinal and transverse wire spacing in certain areas of the mat to the computer, feeding input data relating to the desired longitudinal and transverse strengths of the remaining areas of the mat to a computer, combining said input data in the computer with standard limiting values for the wire mesh mats stored in the computer, determining the economically best combination of values for the wire mesh mats by the computer and transmitting corresponding orders from the computer to the controller of at least one wire mesh welding machine which is equipped with devices for adjusting the longitudinal wire spacing, the transverse wire spacing, the wire mesh mat length and the wire mesh mat width, said devices being controllable by said automatic controller.

9. A process for manufacturing welded wire mesh mats for reinforcing concrete with the aid of a welding machine having wire feeders, devices for adjusting the longitudinal wire spacings, the transverse wire spacing, the wire mesh mat length and the wire mesh mat width, an automatic controller for controlling the operation of said welding machine in response to order signals and a computer for providing and feeding said order signals to said automatic controller, comprising the steps of feeding input data relating to the desired longitudinal and transverse strengths of the wire mesh mats to the computer, combining said input data in the computer with standard limiting values for the wire mesh mats stored in the computer, determining the economically best combination of values for the wire spacings on the basis of given wire diameters by the computer and transmitting the resulting order signals from the computer to buffer-stores, each of said buffer-stores receiving and storing all operating data requisite for manufacturing the program of batches using wires with one of the given diameters and being selectively connectable to the automatic controller of the wire mesh welding machine, the machine being equipped with a plurality of wire feeders, each of said feeders containing wire of one of the given diameters, and selectively connecting the respective buffer store to the automatic controller of the wire mesh welding machine when the machine is changed to receive wire from another feeder.

10. A process for manufacturing welded wire mesh mats for reinforcing concrete with the aid of a plurality of welding machines each having wire feeders, devices for adjusting the longitudinal wire spacing, the transverse wire spacing, the wire mesh mat length and the wire mesh mat width, and an automatic controller for controlling the operation of the respective welding machine in response to order signals and a computer for providing and feeding said order signals to said automatic controllers, comprising the steps of feeding input data relating to the desired longitudinal and transverse strengths of the wire mesh mats to the computer, combining said input data in the computer with standard limiting values for the wire mesh mats stored in the computer, determining the economically best combination of values for the wire spacings on the basis of given wire diameters by the computer and transmitting the resulting order signals from the computer to a plurality of buffer-stores, each of said buffer-stores receiving and storing all operating data requisite for manufacturing the program of batches using wire with one of the given diameters and being connected to the automatic controller of a particular one of the plurality of wire-mesh welding machines to which wire of the corresponding diameter is fed.

* * * * *